United States Patent Office 3,178,457
Patented Apr. 13, 1965

3,178,457
LOWER ALKYL (17β-OXYGENATED Δ⁴-3-OXO-ANDROSTEN-4-YL) THIO IMIDOCARBONATE COMPOUNDS
George de Stevens, Summit, N.J., assignor to Ciba Corporation, New York, N.Y., a corporation of Delaware
No Drawing. Filed Oct. 3, 1962, Ser. No. 227,989
12 Claims. (Cl. 260—397.4)

The present invention relates to androstene compounds, such as lower alkyl (17β-oxygenated Δ⁴-3-oxo-androsten-4-yl)thioimidocarbonate compounds, particularly those of the formula

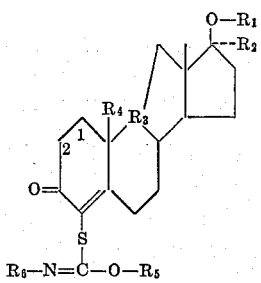

and S - (17β - oxygenated Δ⁴-3-oxo-androsten-4-yl)thiocarbamate compounds, particularly those of the formula

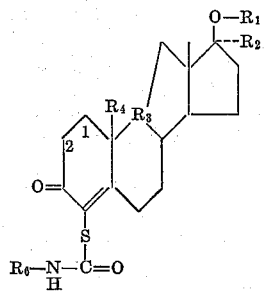

In the above formulae, $R_1$ is hydrogen or the acyl radical of an organic acid, $R_2$ stands for hydrogen or an aliphatic hydrocarbon radical, the group $R_3$ stands for a group having one of the following partial formulae

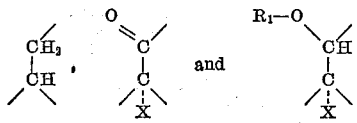

in which $R_1$ has the previously-given meaning, and X stands for hydrogen or halogeno, $R_4$ is methyl or hydrogen, $R_5$ is lower alkyl, and $R_6$ stands for hydrogen or an organic radical, and the linkage between the carbon atom of the 1-position and the carbon atom of the 2-position is a single bond linkage or a double bond linkage. Also included within the scope of the invention is a procedure for the preparation of such compounds.

The compounds of this invention have an oxygen function, particularly a free hydroxyl or an esterified hydroxyl group in the 17β-position. The group $R_1$ in the above formula, which also represents hydrogen, may stand for the acyl radical of an organic carboxylic acid, as well as of an organic sulfonic acid; such acids have preferably from one to twelve carbon atoms, inclusive. They are primarily represented by alkanoic acids, e.g. acetic, propionic, n-butyric, n-valeric, pivalic, caproic, caprylic, pelargonic, capric, undecylic, lauric acid and the like, as well as alkenoic acids, e.g. 3-butenoic, undecylenic acid and the like, cycloalkane carboxylic acids, in which cycloalkane has from three to eight, preferably from five to six, carbon atoms, e.g. cyclopentane carboxylic, cyclohexane carboxylic acid and the like, cycloalkyl-lower alkanoic acids, in which cycloalkyl has from three to eight, preferably from five to six, carbon atoms, e.g. β-cyclopentyl-propionic, cyclohexylacetic, β-cyclopropylpropionic acid and the like, alkane dicarboxylic acids, e.g. oxalic, malonic, succinic, glutaric acid and the like, or lower alkyl, e.g. methyl, ethyl and the like, halfester of such acids, alkene dicarboxylic acids, e.g. maleic, fumaric acid and the like, or lower alkyl, e.g. methyl, ethyl and the like, halfesters of such acids, carbocyclic aryl carboxylic acids, such as monocyclic or bicyclic carbocyclic aryl carboxylic acids, e.g. benzoic, naphthoic acid and the like, carbocyclic aryl dicarboxylic acids, such as monocyclic carbocyclic aryl carboxylic acids, e.g. phthalic, terephthalic acid and the like, or lower alkyl, e.g. methyl, ethyl and the like, halfesters of such acids, carbocyclic aryl-lower alkanoic acids, e.g. phenylacetic, 3-phenylpropionic acid and the like, carbocyclic aryl-lower alkenoic acids, e.g. cinnamic acid and the like, heterocyclic aryl carboxylic acids, such as monocyclic heterocyclic aryl carboxylic acids, for example, pyridine carboxylic acids, e.g. nicotinic, isonicotinic acid and the like, furan carboxylic acids, e.g. 2-furoic acid and the like, thiophene carboxylic acids, e.g. 2-thiophene carboxylic acid and the like, or heterocyclic aryl-aliphatic carboxylic acids, such as monocyclic heterocyclic aryl-lower alkanoic acids, for example, pyridyl-lower alkane carboxylic acids, e.g. 2-pyridyl-acetic, 3-pyridyl-acetic, β-(4-pyridyl)-propionic acid and the like, or any other suitable organic carboxylic acid. Organic sulfonic acids are represented, for example, by alkane sulfonic acids, e.g. methane sulfonic, ethane sulfonic acid and the like, alkane disulfonic acids, e.g. ethane 1,2-disulfonic acid and the like, carboxylic aryl sulfonic acids, such as monocyclic carbocyclic aryl sulfonic acids, e.g. p-toluene sulfonic acid and the like, or any other suitable organic sulfonic acid.

Apart from representing hydrogen, $R_2$ stands for an aliphatic hydrocarbon radical, having preferably from one to four carbon atoms, especially lower alkyl, e.g. methyl, ethyl, n-propyl, isopropyl, n-butyl, isobutyl and the like, as well as lower alkenyl, e.g. vinyl, allyl, 2-methyl-allyl, 3-methyl-allyl and the like, or lower alkynyl, e.g. ethynyl, 1-propynyl and the like.

The group $R_3$ represents primarily the group of the formula

as well as one of the other groups indicated above. X in the groups of the formulae

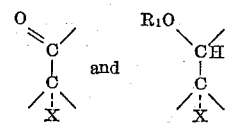

whenever representing halogeno, stands preferably for halogeno having an atomic weight below 80, particularly fluoro, as well as chloro or bromo. $R_1$ in the formula

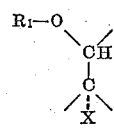

stands primarily for hydrogen, but may also represent the acyl radical of an organic acid, particularly of one of the above-described organic carboxylic acids having from one to twelve carbon atoms, inclusive.

$R_4$ may represent hydrogen, but stands especially for methyl.

The group $R_5$ is lower alkyl, having preferably from one to four carbon atoms, e.g. methyl, ethyl, n-propyl, isopropyl, n-butyl, secondary butyl and the like.

The group $R_6$ is hydrogen, but may also be an organic radical. Such radical is primarily an aliphatic radical, particularly lower alkyl, having preferably from one to four carbon atoms, e.g. methyl, ethyl, n-propyl, isopropyl, n-butyl, secondary butyl and the like, as well as a cycloaliphatic radical, such as cycloalkyl having from three to eight, preferably from five to seven, carbon atoms, e.g. cyclopropyl, cyclopentyl, cyclohexyl, cycloheptyl and the like, a cycloaliphatic-aliphatic radical, such as cycloalkyl-lower alkyl, in which cycloalkyl has from three to eight, preferably from five to seven, carbon atoms, and lower alkyl has from one to four carbon atoms, e.g. cyclopropylmethyl, cyclopentylmethyl, 2-cyclopentylethyl, cyclohexylmethyl, 1-cyclohexylethyl, cycloheptylmethyl and the like, a carbocyclic aryl radical, such as a monocyclic carbocyclic aryl or a bicyclic carbocyclic aryl radical, e.g. phenyl, 1-naphthyl, 2-naphthyl and the like, or substituted phenyl or substituted naphthyl radicals, particularly (lower alkyl)-phenyl, e.g. 4-methyl-phenyl, 2,5-dimethyl-phenyl, 3-ethyl-phenyl, 4-isopropyl-phenyl and the like, (lower alkoxy)-phenyl, e.g. 4-methoxy-phenyl, 3,4,5-trimethoxy-phenyl, 2-ethoxy-phenyl and the like, (halogeno)-phenyl, e.g. 4-fluoro-phenyl, 4-chloro-phenyl, 2,5-dichloro-phenyl, 3-bromo-phenyl and the like, (trifluoromethyl)-phenyl, e.g. 4-trifluoromethyl-phenyl and the like, or any other substituted phenyl, as well as substituted naphthyl radical, a carbocyclic aryl-aliphatic radical, such as monocyclic carbocyclic aryl-lower alkyl, for example, phenyl-lower alkyl, e.g. benzyl, 1-phenylethyl, 2-phenylethyl, diphenyl methyl and the like, or (substituted phenyl)-lower alkyl, in which substituted phenyl has the above-given meaning, or any other suitable organic radical, such as, for example, pyridyl, e.g. 2-pyridyl, 4-pyridyl and the like, pyridyl-lower alkyl, e.g. 2-pyridylmethyl and the like.

Preferably, the androstene compounds of this invention are those of the $\Delta^4$-androstene series, i.e. compounds, which have a double bond extending from the 4-position to the 5-position. They may also be of the $\Delta^{1,4}$-androstadiene series in which one double bond extends from the 1-position to the 2-position and the other from the 4-position to the 5-position.

The compounds of this invention have gonadotrophin-inhibiting effects; they influence the regulation of the ovulation and the endometrial and placental development, and can, therefore, be used as antifertility agents. Compounds of this invention also show estrogenic properties, and can, therefore, be used in lieu of known compounds having estrogenic effects such as estradiol and the like.

Particularly useful are the lower alkyl (17β-oxygenated $\Delta^4$-3-oxo-androsten-4-yl)thio imidocarbonate compounds of the formula

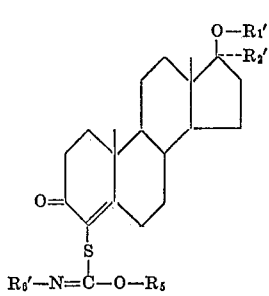

and the S-(17β-oxygenated $\Delta^4$-3-oxo-androsten-4-yl) thiocarbamate compounds of the formula

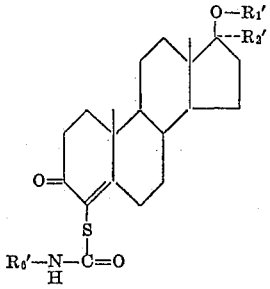

in which $R_1'$ stands for hydrogen or lower alkanoyl, $R_2'$ is hydrogen or lower alkyl, $R_5$ has the previously given meaning, i.e. stands for lower alkyl, and $R_6'$ is hydrogen or lower alkyl.

The compounds of this invention may be used in the form of compositions suitable for enteral or parenteral administration, which contain the new compounds in admixture with an acceptable organic or inorganic, solid or liquid carrier. For making up the preparations, there can be employed substances which do not react with the new compounds, such as water, gelatine, lactose, starches, stearic acid, magnesium stearate, stearyl alcohol, talc, vegetable oils, lauryl alcohol, cetyl alcohol, benzyl alcohol, gums, propylene glycol, polyalkylene glycols, or any other known inert carrier substance used in such preparations. The latter may be used in solid form, for example, as capsules, tablets, dragees and the like, or in liquid form, for example, as solutions, suspensions, and the like. If desired, they may contain auxiliary substances, such as preserving, stabilizing, wetting, emulsifying, coloring agents and the like, salts for varying the osmotic pressure, buffers, etc. They may also contain, in combination, other useful substances.

The compounds of the present invention may be prepared, for example, by reacting a 17β-oxygenated $\Delta^4$-4-halogeno-androsten-3-one compound, particularly a compound of the formula

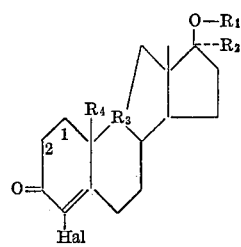

in which $R_1$, $R_2$, $R_3$, and $R_4$ have the previously-given meaning, Hal stands for a halogeno atom, and in which the linkage between the carbon atom of the 1-position and the carbon atom of the 2-position is a single bond linkage or a double bond linkage, with a lower alkyl thionocarbamate compound, particularly a compound having one of the tautomeric formulae

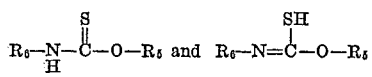

in which $R_5$ and $R_6$ have the previously given meaning, and, if desired, converting a resulting lower alkyl(17β- oxygenated Δ⁴-3-oxo-androsten-4-yl)thio imidocarbonate compound, particularly a compound of the formula

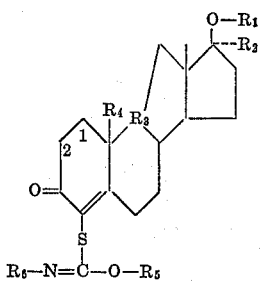

in which $R_1$, $R_2$, $R_3$, $R_4$, $R_5$ and $R_6$ have the previously-given meaning, and in which the linkage between the carbon atom of the carbon atom of the 1-position and the carbon atom of the 2-position is a single bond linkage or a double bond linkage, into an S-(17β-oxygenated Δ⁴-3-oxo-androsten-4-yl)thiocarbamate compound, particularly into a compound of the formula

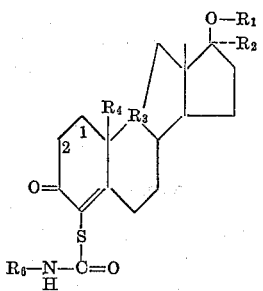

in which $R_1$, $R_2$, $R_3$, $R_4$ and $R_6$ have the previously-given meaning, and in which the linkage between the carbon atom of the 1-position and the carbon atom of the 2-position is a single bond linkage or a double bond linkage, and, if desired, replacing in a resulting compound, in which the linkage between the carbon atom of the 1-position and the linkage between the carbon atom of the 2-position is a single bond linkage, such single bond linkage by a double bond linkage, and/or, if desired, converting in a resulting compound having an esterified hydroxyl group, such group into a free hydroxyl group, particularly replacing in a resulting compound, in which the group $R_1$ is an acyl radical, such radical by hydrogen, and/or, if desired, converting in a resulting compound having a free hydroxyl group, such group into an esterified hydroxyl group, particularly replacing in a resulting compound, in which the group $R_1$ is hydrogen, such hydrogen by an acyl radical.

In the starting material used in the above reaction, the halogeno atom Hal stands primarily for halogeno having an atomic weight between 35 and 80, especially chloro, as well as bromo. The lower alkyl thionocarbamate reagent used in the above reaction is above all a lower alkyl thionocarbamate or a lower alkyl N-lower alkyl-thionocarbamate, in which lower alkyl, has preferably from one to four carbon atoms, e.g. methyl, ethyl, n-propyl, isopropyl, n-butyl, secondary butyl and the like. This reagent has one of the following tautomeric formulae:

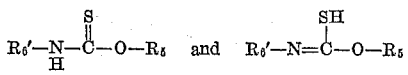

in which $R_5$ and $R_6'$ have the previously given meaning.

The reaction is preferably carried out in the presence of a suitable inert solvent, such as, for example, a lower alkanol, e.g. methanol, ethanol, isopropanol and the like, and at an elevated temperature. Upon carrying out the reaction over a prolonged period of time, the initially formed androstene compound having in the 4-position a lower alkyl thio imidocarbonate substituent of the formula

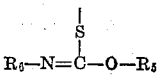

in which $R_5$ and $R_6$ have the previously given meaning, is converted into a androstene compound having in the 4-position a thiocarbamate substituent of the formula

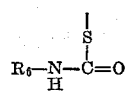

in which $R_6$ has the previously given meaning. Simultaneously with such conversion, a group $-O-R_1$ in the 17β-position, whenever representing an esterified hydroxyl group, may be hydrolized and the free hydroxyl group may be formed (i.e. $R_1$ standing for hydrogen). The conversion of one form into the other depends on the period of heating (it appears that in the presence of ethanol the conversion begins to occur by heating the reaction mixture for more than about 50 hours and is completed after about 72 hours) and on the temperature (for example, by refluxing in a higher boiling solvent). As mentioned above, an esterified hydroxyl group in the 17β-position may be hydrolized to the free hydroxyl group, if the reaction period is prolonged. If necessary, the reaction is performed in a closed vessel and/or, in the atmosphere of an inert gas, e.g. nitrogen and the like.

The starting materials are known; they may be prepared according to known methods, for example, according to the procedure described by Camerino et al., J. Am. Chem. Soc., vol. 78, p. 3540 (1956), and Camerino et al., Il Farmaco, Ed. Sci., vol. 13, p. 52 (1958), abstracted in C. A., vol. 52, p. 13768 (1958). Generally a 17β-oxygenated Δ⁴-androsten-3-one compound is reacted with alkaline hydrogen peroxide, the mixture of the resulting 17β-oxygenated 4α,5α-oxido-androstan-3-one compound and 17β-oxygenated 4β,5β-oxido-androstan-3-one compound is separated by crystallization, and either one of the isomeric oxido compounds or the mixture thereof, when treated with a hydrogen halide in the presence of acetic acid, yields the desired 17β-oxygenated Δ⁴-4-halogeno-androsten-3-one compound, into which a 1,2-double bond may be introduced according to known chemical or biochemical methods, and in which the oxygen function in the 17β-position may be converted into another oxygen function as described below.

A double bond extending from the 1-position to the 2-position may be introduced into a resulting compound having a single bond extending from the 1-position to the 2-position according to known methods, such as, for example, described by Fieser and Fieser, Steroids, pages 686 to 689 (Reinhold, 1959).

An esterified hydroxyl group of the formula $-O-R_1$, in which $R_1$ represents the acyl radical of an organic acid, may be converted into a free hydroxyl group, and the latter may be esterified with an organic acid according to well known hydrolysis and esterification methods described in the art, for example, by Fieser and Fieser, Steroids (Reinhold, 1959).

The invention also comprises any modification of the process wherein a compound obtainable as an intermediate at any stage of the process is used as starting material, and the remaining step(s) of the process is(are) carried out, as well as any new intermediates.

In the process of this invention such starting materials are preferably used which lead to final products mentioned in the beginning as preferred embodiments of the invention.

This is a continuation-in-part application of my application Serial No. 151,147, filed November 9, 1961, now abandoned.

The following examples are intended to illustrate the

Example 1

A mixture of 2.0 g. of $\Delta^4$-17β-acetyloxy-4-chloro-androsten-3-one and 0.57 g. of ethyl thionocarbamate in 25 ml. of ethanol is refluxed for a total of fifty hours. The reaction mixture is chilled, the solid material is filtered off and recrystallized from a large volume of ethanol to yield the O-ethyl ($\Delta^4$-17β-acetyloxy-3-oxo-androsten-4-yl) thio imidocarbonate of the formula

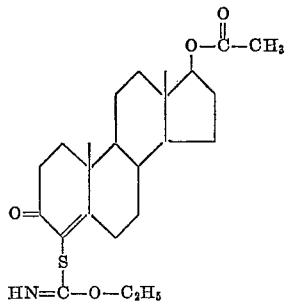

which melts at 208°.

Other compounds, which may be prepared according to the above procedure are, for example, O-methyl ($\Delta^4$-3-oxo - 17β-propionyloxy-androsten-4-yl)thio imidocarbonate, O-ethyl ($\Delta^4$ - 17β-hydroxy-17α-methyl-3-oxo-androsten-4-yl)thio imidocarbonate, O-ethyl ($\Delta^{1,4}$-3-oxo-17β-propionyloxy-androstadien-4-yl)thio imidocarbonate, O-isopropyl ($\Delta^4$-17β-cyclopentylpropionyloxy-3-oxo-androsten-4-yl)thio imidocarbonate, O-ethyl ($\Delta^4$-17β-acetyloxy-19-nor-3-oxo-androsten-4-yl)thio imidocarbonate, O-ethyl ($\Delta^4$-9α-fluoro-11β,17β-dihydroxy-17α-methyl-3-oxo-androsten-4-yl)thio imidocarbonate, O-ethyl ($\Delta^4$-3,11-dioxo-17β-hydroxy-androsten-4-yl)thio imidocarbonate, O-ethyl ($\Delta^4$ - 17β-acetyloxy-3-oxo-androsten-4-yl)thio N-methyl-imidocarbonate, O-n-butyl ($\Delta^4$-17β-benzoyloxy-3-oxo-androsten-4-yl)thio N-benzyl-imidocarbonate, O-ethyl ($\Delta^{1,4}$-17β-hydroxy-3-oxo-androstadien-4-yl)thio N-phenyl-imidocarbonate and the like. The starting materials used for the preparation of these compounds according to the above procedure, are known or may be prepared according to the generally applicable method described by Camerino et al., loc. cit.

Example 2

A mixture of 4.0 g. of $\Delta^4$-17β-acetyloxy-4-chloro-androsten-3-one and 1.2 g. of ethyl thionocarbamate in 50 ml. of ethanol is refluxed for five days. The precipitate is filtered off from the cold solution and is recrystallized to yield the S-($\Delta^4$-17β-hydroxy-3-oxo-androsten-4-yl) thiocarbamate of the formula

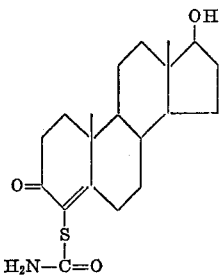

which melts at 280°. Upon treatment with propionyl chloride in pyridine the S-($\Delta^4$-3-oxo-17β-propionyloxy-androsten-4-yl) thiocarbamate is formed.

Example 3

A mixture of 3.6 g. of $\Delta^4$-17β-acetyloxy-4-chloro-androsten-3-one and 1.3 g. of isopropyl N-methyl-thionocarbamate in 100 ml. of ethanol is refluxed for three days during which the resulting O-isopropyl ($\Delta^4$-17β-acetyl-oxy - 3 - oxo - androsten - 4 - yl)thio N - methyl - imidocarbonate of the formula

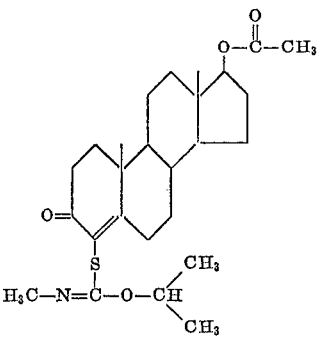

is converted into the S-($\Delta^4$-17β-hydroxy-3-oxo-androsten-4-yl)N-methyl-thiocarbamate of the formula

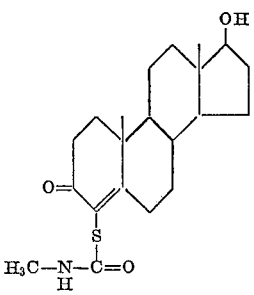

The latter is isolated by removing the solvent under reduced pressure, taking up the residue in diethyl ether and filtrating the precipitate; it melts at 223–225° after recrystallization from methanol.

Other compounds, which may be prepared according to the above procedure are, for example, S-($\Delta^4$-17β-hydroxy-3-oxo-androsten-4-yl) N-ethyl-thiocarbamate,
S-($\Delta^4$-17β-hydroxy-17α-methyl-3-oxo-androsten-4-yl) thiocarbamate,
S-($\Delta^{1,4}$-17β-hydroxy-3-oxo-androstadien-4-yl) thiocarbamate,
S-($\Delta^4$-17β-hydroxy-17α-ethyl-3-oxo-androsten-4-yl) thiocarbamate,
S-($\Delta^4$-17β-hydroxy-19-nor-3-oxo-androsten-4-yl) thiocarbamate,
S-($\Delta^4$-9α-fluoro-11β,17β-dihydroxy-17α-methyl-3-oxo-androsten-4-yl) thiocarbamate,
S-($\Delta^4$-3,11-dioxo-17β-hydroxy-androsten-4-yl) thiocarbamate,
S-($\Delta^4$-17β-hydroxy-3-oxo-androsten-4-yl) N-isopropyl-thiocarbamate,
S-($\Delta^4$-17β-hydroxy-3-oxo-androsten-4-yl) N-benzyl-thiocarbamate,
S-($\Delta^{1,4}$-17β-hydroxy-3-oxo-androstadien-4-yl) N-phenyl-thiocarbamate and the like.

What is claimed is:
1. A member selected from the group consisting of a lower alkyl (17β-oxygenated $\Delta^4$-3-oxo-androsten-4-yl)-thio imidocarbonate having the formula

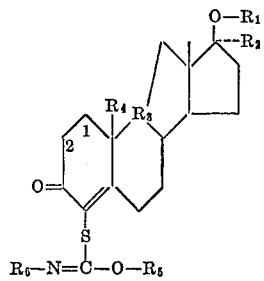

and an S-(17β-oxygenated Δ⁴-3-oxo-androsten-4-yl)thiocarbamate of the formula

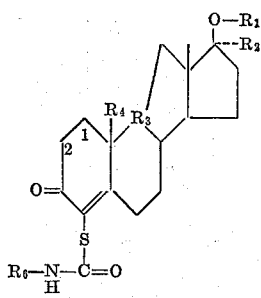

in which formulae R₁ is a member selected from the group consisting of hydrogen and the acyl radical of an organic carboxylic acid, having from 1 to 12 carbon atoms, R₂ is a member selected from the group consisting of hydrogen, lower alkyl, lower alkenyl and lower alkynyl, R₃ is a group having a formula selected from the group consisting of

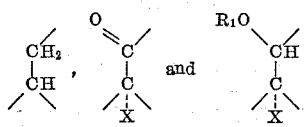

in which R₁ has the previously-given meaning, and X is a member selected from the group consisting of hydrogen and halogeno, R₄ is a member selected from the group consisting of methyl and hydrogen, R₅ is lower alkyl, and R₆ is a member selected from the group consisting of hydrogen, lower alkyl, cycloalkyl having 3 to 8 carbon atoms, cycloalkyl-lower alkyl in which cycloalkyl has from 3 to 8 carbon atoms, monocyclic carbocyclic aryl, bicyclic carbocyclic aryl, (lower alkyl)-phenyl, (lower alkoxy) - phenyl, (halogeno) - phenyl, (lower alkyl)-naphthyl, (lower alkoxy)-naphthyl, (halogeno)-naphthyl and carbocyclic aryl-lower alkyl, and in which the linkage between the carbon atom of the 1-position and the carbon atom of the 2-position is selected from the group consisting of a single bond linkage and a double bond linkage.

2. A compound of the formula

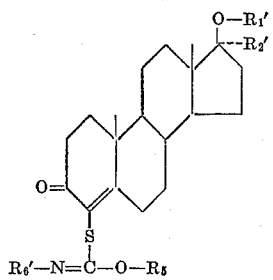

in which R₁' is a member selected from the group consisting of hydrogen and lower alkanoyl, R₂' is a member selected from the group consisting of hydrogen and lower alkyl, R₅ is lower alkyl, and R₆' is a member selected from the group consisting of hydrogen and lower alkyl.

3. O - ethyl (Δ⁴ - 17β - acetyloxy - 3 - oxo - androsten-4-yl)thio imidocarbonate.

4. O - isopropyl (Δ⁴ - 17β - acetyloxy - 3 - oxo - androsten-4-yl)thio N-methyl-imidocarbonate.

5. A compound of the formula

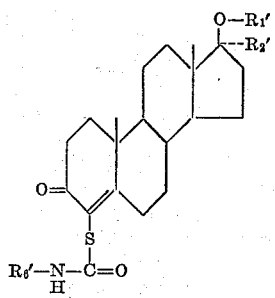

in which R₁' is a member selected from the group consisting of hydrogen and lower alkanoyl, R₂' is a member selected from the group consisting of hydrogen and lower alkyl, and R₆' is a member selected from the group consisting of hydrogen and lower alkyl.

6. S - (Δ⁴ - 17β - hydroxy - 3 - oxo - androsten - 4 - yl) thiocarbamate.

7. S - (Δ⁴ - 17β - hydroxy - 3 - oxo - androsten - 4 - yl) N-methyl-thiocarbamate.

8. Process for the preparation of lower alkyl (17β-oxygenated Δ⁴-3-oxo-androsten-4-yl)thio imidocarbonate compounds and S-(17β-oxygenated Δ⁴-3-oxo-androsten-4-yl) thiocarbamate compounds, which comprises reacting a 17β-oxygenated Δ⁴-4-halogeno-androsten-3-one compound with a lower alkyl thionocarbamate, and converting, by continual heating a resulting lower alkyl (17β-oxygenated Δ⁴-3-oxo-androsten-4-yl)thio imidocarbonate compound into an S-(17β-oxygenated Δ⁴-3-oxo-androsten-4-yl) thiocarbamate compound.

9. Process for the preparation of a compound having the formula selected from the group consisting of

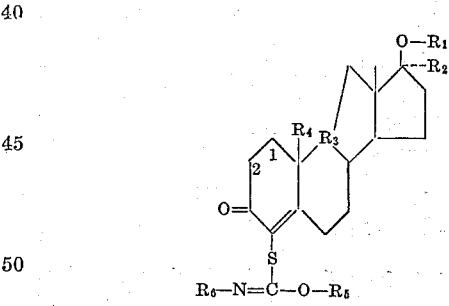

and

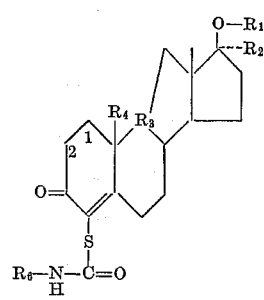

in which formulae R₁ is a member selected from the group consisting of hydrogen and the acyl radical of an organic carboxylic acid, having from 1 to 12 carbon atoms, R₂ is a member selected from the group consisting of hydrogen lower alkyl, lower alkenyl and lower alkynyl, $R_3$ is a group having a formula selected from the group consisting of

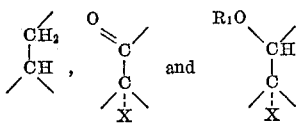

in which $R_1$ has the previously-given meaning, and X is a member selected from the group consisting of hydrogen and halogeno, $R_4$ is a member selected from the group consisting of methyl and hydrogen, $R_5$ is lower alkyl, and $R_6$ is a member selected from the group consisting of hydrogen, lower alkyl, cycloalkyl having 3 to 8 carbon atoms, cycloalkyl-lower alkyl in which cycloalkyl has from 3 to 8 carbon atoms, monocyclic carbocyclic aryl, bicyclic carbocyclic aryl, (lower alkyl)-phenyl, (lower alkoxy)-phenyl, (halogen)-phenyl, (lower alkyl)-naphthyl, (lower alkoxy)-naphthyl, (halogeno)-napthyl and carbocyclic aryl-lower alkyl, and in which the linkage between the carbon atom of the 1-position and the carbon atom of the 2-position is selected from the group consisting of a single bond linkage and a double bond linkage, which comprises reacting a compound of the formula

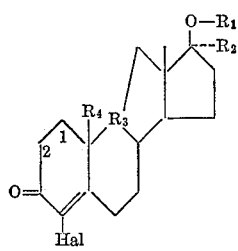

in which $R_1$, $R_2$, $R_3$ and $R_4$ have the previously-given meaning, Hal is halogeno, and in which the linkage between the carbon atom of the 1-position and the carbon atom of the 2-position is selected from the group consisting of a single bond linkage and a double bond linkage, with a lower alkyl thionocarbamate having the formula selected from the group consisting of

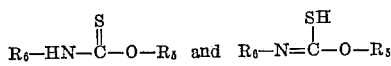

in which $R_5$ and $R_6$ have the previously-given meaning, and converting, by continued heating, a resulting lower alkyl (17β-oxygenated Δ⁴-3-oxo-androsten-4-yl)thio imidocarbonate compound of the formula

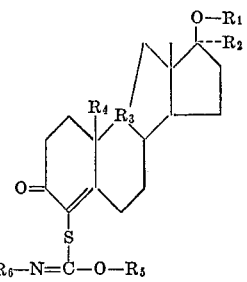

in which $R_1$, $R_2$, $R_3$, $R_4$, $R_5$ and $R_6$ have the previously given meaning, into an S-(17β-oxygenated Δ⁴-3-oxo-androsten-4-yl) thiocarbamate compound of the formula

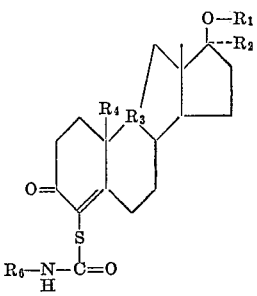

in which $R_1$, $R_2$, $R_3$, $R_4$ and $R_6$ have the previously given meaning.

10. Process according to claim 9, which comprises using as the starting material a 17β-oxygenated Δ⁴-4-halogen-androsten-3-one, in which halogeno has an atomic weight between 35 and 80.

11. Process according to claim 10, which comprises using as the starting material in which halogeno is chloro.

12. Process according to claim 9, which comprises using a lower alkyl thionocarbamate having one of the tautomeric formulae

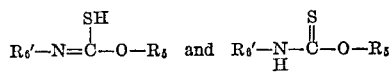

in which $R_5$ is lower alkyl and $R_6'$ stands for a member selected from the group consisting of hydrogen and lower alkyl, as the lower alkyl thionocarbamate reagent.

No references cited.

LEWIS GOTTS, *Primary Examiner.*